US012447368B2

(12) United States Patent
Retallick

(10) Patent No.: US 12,447,368 B2
(45) Date of Patent: Oct. 21, 2025

(54) MOBILE BUNGY JUMP APPARATUS AND METHOD FOR OPERATING THE SAME

(71) Applicants: GO BUNGY INTERNATIONAL PTE. LTD., Singapore (SG); Beau Retallick, Singapore (SG)

(72) Inventor: Beau Retallick, Singapore (JP)

(73) Assignee: GO BUNGY INTERNATIONAL PTE. LTD., Singapore (SG)

( * ) Notice: Subject to any disclaimer, the term of this patent is extended or adjusted under 35 U.S.C. 154(b) by 510 days.

(21) Appl. No.: 18/102,098

(22) Filed: Jan. 27, 2023

(65) Prior Publication Data

US 2024/0149092 A1 May 9, 2024

(30) Foreign Application Priority Data

Nov. 8, 2022 (SG) ............................ 10202260007T

(51) Int. Cl.
*A63B 5/16* (2006.01)
*B66F 11/04* (2006.01)

(52) U.S. Cl.
CPC .......... *A63B 5/16* (2013.01); *A63B 2005/163* (2013.01); *A63B 2210/58* (2013.01); *B66F 11/04* (2013.01)

(58) Field of Classification Search
CPC ..... A63B 5/16; A63B 5/166; A63B 2005/163; B66F 11/04
See application file for complete search history.

(56) References Cited

U.S. PATENT DOCUMENTS 5,267,887 A * 12/1993 Licata .................... A63H 17/12 446/490
7,182,695 B1 * 2/2007 Tostenson ............. A63G 31/00 472/133
8,631,902 B2 * 1/2014 Crook .................. B66F 11/046 182/2.11
9,561,448 B1 * 2/2017 Bethers .................. A63C 19/10
11,673,783 B1 * 6/2023 Brunk, III ............ B66F 11/046 182/63.1
2010/0276227 A1 * 11/2010 Fuqua .................. B66F 11/044 182/63.1
2018/0185689 A1 * 7/2018 Scott ........................ A63B 5/16

FOREIGN PATENT DOCUMENTS

CZ 510 U1 * 9/1993

* cited by examiner

*Primary Examiner* — Alexander K Garlen
(74) *Attorney, Agent, or Firm* — Miles & Stockbridge PC; Ajay A. Jagtiani

(57) ABSTRACT

Embodiments of the invention provide for a mobile bungy jump apparatus which comprises a wheeled vehicle, e.g. truck, and a jump-off platform carried by the wheeled vehicle through a retractable apparatus coupled to the wheeled vehicle, wherein the jump-off platform retractable apparatus is configured to at least move between a non bungy jumping position and a bungy jumping position, and wherein retractable apparatus includes a jump-off platform and a rigging frame or equivalent to which a bungy cord tethering a bungy jumper may be attached.

23 Claims, 12 Drawing Sheets

FIG. 9A
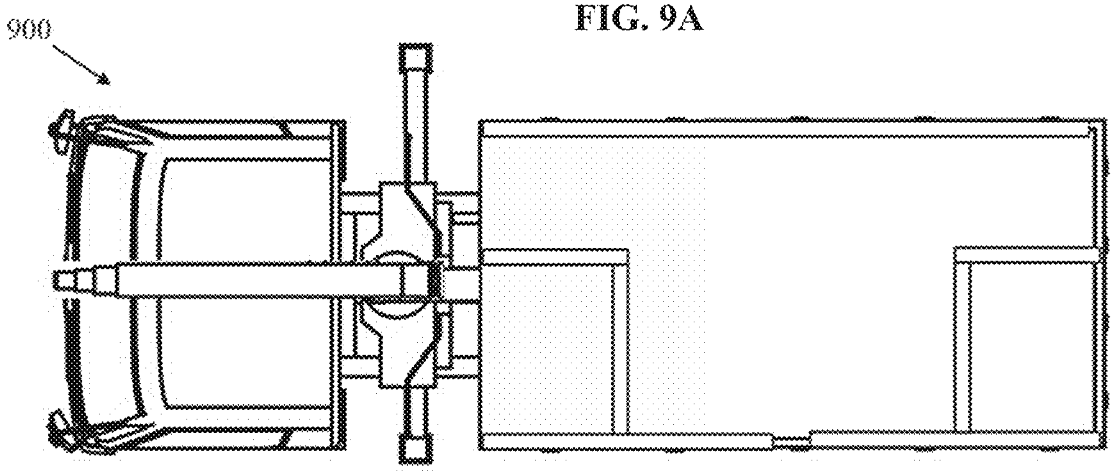
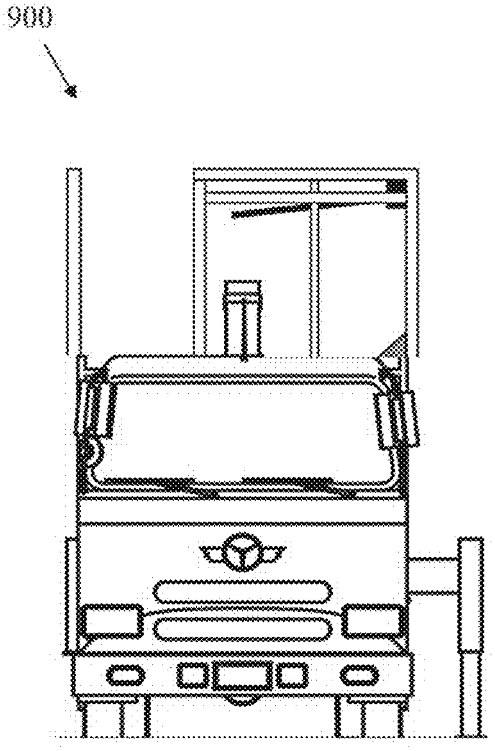
FIG. 9B
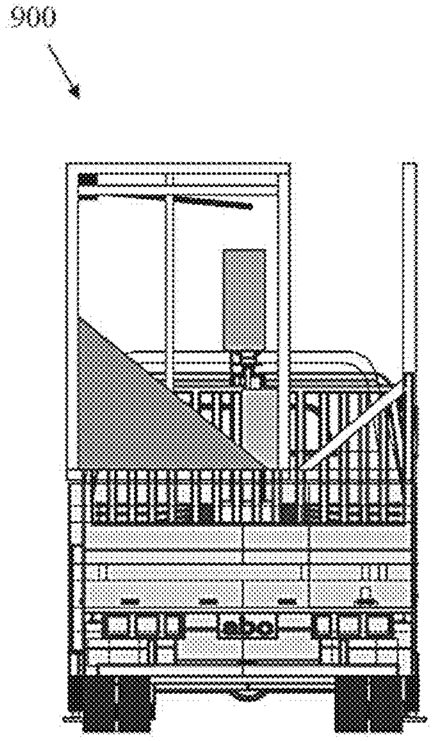
FIG. 9C

MOBILE BUNGY JUMP APPARATUS AND METHOD FOR OPERATING THE SAME

CROSS-REFERENCE TO RELATED APPLICATION

This application claims benefit of priority of Singapore Patent Application No. 10202260007T, entitled "MOBILE BUNGY JUMP APPARATUS AND METHOD FOR OPERATING THE SAME," filed Nov. 8, 2022. The entire content and disclosure of this patent application is incorporated herein by reference in its entirety.

TECHNICAL FIELD

Various embodiments relate to a bungy jump apparatus, and more particularly, a mobile bungy jump apparatus and a method of operating the mobile bungy jump apparatus.

BACKGROUND

Bungy jumping, also known as bungee jumping, is a popular adventure sport and has been commercially operated for about 30 years. In bungy jumping, a bungy jumper jumps off a tall structure, such as a building, bridge, natural geographic feature, or crane, onto which a bungy jumping platform is erected for locating and fixing the bungy jump equipment and accommodating the bungy jumper and operation personnel.

Commercial bungy jumping platforms that are fixed on/to tall infrastructures or natural geographic features are usually time-consuming and costly to construct. The construction of bungy jumping platforms on these structures can also create obstructions that are not acceptable for long periods of time or cause damages that are not reversible.

Additionally, the commercial bungy jumping platforms will also have varied popularity, depending on proximity to other sites, time of the year, age of the site, and various other factors. Therefore, some platforms can only be open for a limited time in a year, which results in inefficient use of the bungy jumping equipment and personnel.

To address the above issues, there is a need for an apparatus and a method that may eliminate or at least minimize obstructions or damages to the jumping structures and may be relocated according to the seasonal popularity conveniently and may reduce the complexity of relocating, setting up, and operating a bungy jumping platform in terms of the time and labor required.

SUMMARY OF INVENTION

Embodiments of the invention provide for a mobile bungy jump apparatus that comprises a wheeled vehicle, e.g. truck, and a jump-off platform carried by the wheeled vehicle through a retractable apparatus coupled to the wheeled vehicle, wherein the jump-off platform is configured to at least move between a non-bungy jumping position and a bungy jumping position, and wherein the retractable apparatus includes a jump-off platform and a rigging frame or equivalent to which a bungy cord tethering a bungy jumper may be attached.

According to an embodiment, a mobile bungy jump apparatus is provided. The mobile bungy jump apparatus may include a wheeled vehicle chassis, a retractable apparatus mounted on the wheeled vehicle chassis for providing a jump-off platform with a first stowed position for transportation, or a first extended position for off-bridge access. The jump-off platform may be movably coupled to the retractable apparatus and storable substantially within a footprint of the wheeled vehicle chassis when the jump-off platform is in the first stowed position, and extendable from the retractable apparatus when the jump-off platform is in the first extended position for bungy jumping. A rigging frame is fixedly coupled to the jump-off platform and configured to be secured to an end of a bungy cord having another end securable to a bungy jumper.

Advantageously, the bungy jumping apparatus may require less labor to relocate, set up, and operate and may provide better stability in both transporting and operating processes and may take a smaller footprint in a bungy jumping site.

According to an embodiment, a method of operating a mobile bungy jumping apparatus is provided. The method may include: arranging the mobile bungy jumping apparatus at a current bungy site while maintaining the retractable apparatus in a second stowed position; arranging the jump-off platform in a first extended position for bungy jumping; securing an end of a bungy cord to the rigging frame and secure another end of the bungy cord to a bungy jumper; facilitating the jumping of the bungy jumper from the jump-off platform.

Advantageously, the method of operating the mobile bungy jumping apparatus may require less labor to operate the apparatus stably and safely.

BRIEF DESCRIPTION OF DRAWINGS

In the drawings, like reference characters generally refer to like parts throughout the different views. The drawings are not necessarily to scale, emphasis instead generally being placed upon illustrating the principles of the invention. In the following description, various embodiments of the invention are described with reference to the following drawings, in which:

FIG. 9A is a schematic diagram illustrating a top view of another exemplary mobile bungy jump apparatus in a stowed position, according to various embodiments.

FIG. 9B is a schematic diagram illustrating a front view of the exemplary mobile bungy jump apparatus of FIG. 9A, according to various embodiments.

FIG. 9C is a schematic diagram illustrating a rear view of the exemplary mobile bungy jump apparatus of FIG. 9A, according to various embodiments.

DETAILED DESCRIPTION

Figure 1:
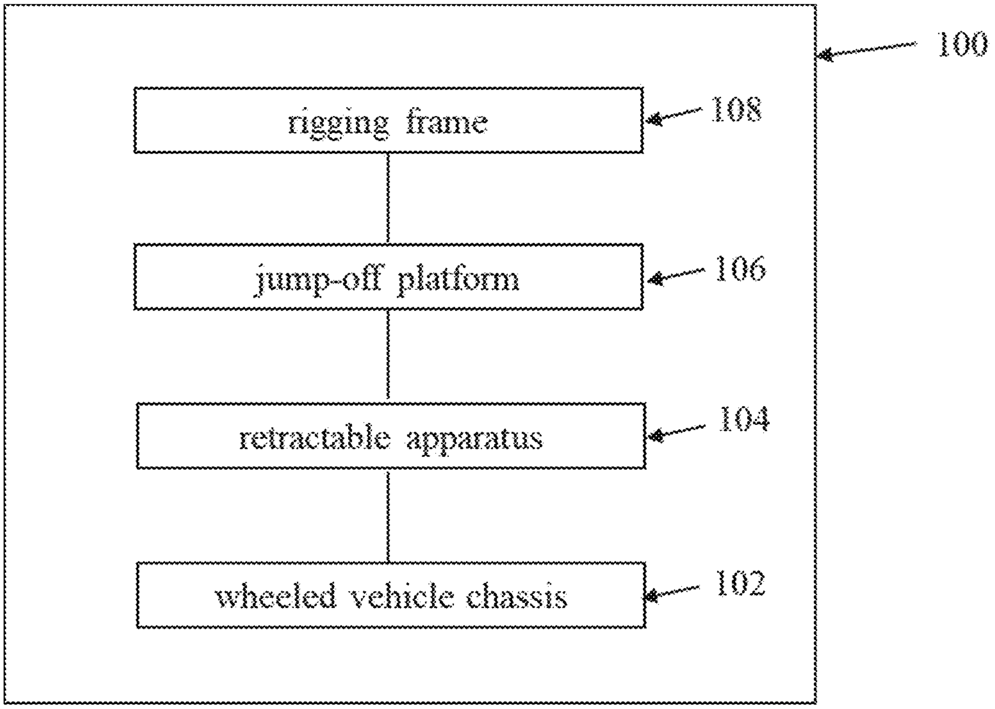
FIG. 1 is a schematic diagram illustrating a mobile bungy jump apparatus, according to various embodiments.

The following detailed description refers to the accompanying drawings that show, by way of illustrations, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more embodiments to form new embodiments.

Embodiments described in the context of one of the methods or apparatus are analogously valid for the other methods or apparatus. Similarly, embodiments described in the context of a method are analogously valid for an apparatus, and vice versa.

Features that are described in the context of an embodiment may correspondingly be applicable to the same or similar features in the other embodiments. Features that are described in the context of an embodiment may correspondingly be applicable to the other embodiments, even if not explicitly described in other embodiments. Furthermore, additions and/or combinations and/or alternatives described for a feature in the context of an embodiment may correspondingly be applicable to the same or similar feature in the other embodiments.

In the context of various embodiments, the articles "a", "an", and "the" as used with regard to a feature or element include a reference to one or more of the features or elements. The terms "comprising", "including", "having", and any of their related terms, as used in description and claims, are intended to be open-ended and mean that there may be additional features or elements other than the listed ones.

As used herein, the phrase of the form of "A and/or B" may include A or B or both A and B.

In the context of various embodiments, the phrases "configured to", "arranged to", "constructed and arranged to" and "adapted to" may be used interchangeably.

Although the terms first and second may be used herein to describe various stowed positions and extended positions, these positions should not be limited by these terms. These terms may be only used to distinguish one position from another position. Terms such as "first", "second", and other numerical terms when used herein do not imply a sequence or order unless indicated by the context. In the following context, the term "first" generally refers to the jump-off platform, and the term "second" generally refers to the retractable apparatus.

In the context of various embodiments, the term "modified" may include both reversible and non-reversible modifications.

Various embodiments may provide a bungy jump apparatus. For example, the bungy jump apparatus may non-labor intensively set up a bungy jump platform at an elevated but limited bungy jump space, e.g., a bridge or a cliff, for a bungy jumper and provide a safe place for accommodating the bungy jump equipment and personnel.

Various embodiments may provide a method of operating a bungy jump apparatus, for example, the steps of setting up the bungy jump location for a bungy jumper to jump off and recover.

FIG. 1 is a schematic diagram illustrating a mobile bungy jump apparatus 100, in accordance with various embodiments. As seen in FIG. 1, the mobile bungy jump apparatus 100 may include a wheeled vehicle chassis 102, a retractable apparatus 104, a jump-off platform 106, and a rigging frame 108. The retractable apparatus 104 may be mounted on the wheeled vehicle chassis 102 for providing the jump-off platform 106 with a first stowed position for transportation or a first extended position for off-bridge access. The jump-off platform 106 may be movably coupled to the retractable apparatus 104 and storable substantially within a footprint of the wheeled vehicle chassis 102 when the jump-off platform 106 is in the first stowed position, and extendable from the retractable apparatus 104 when the jump-off platform 106 is in the first extended position for bungy jumping. The rigging frame 108 may be fixedly coupled to the jump-off platform 106 and configured to be secured to an end of a bungy cord (e.g. 119 in FIG. 4) having another end securable to a bungy jumper (e.g. 118 in FIG. 4).

Referring to FIG. 1 and parts of FIGS. 2A to 12, the wheeled vehicle chassis 102 may be modified or adapted from any type of vehicle that may be self-propelling or movable, which may provide the mobile bungy apparatus 100 with flexibility in mobility with less labor involved. The wheeled vehicle chassis 102 may be driven or hauled to a target bungy jumping site. This in turn eases the transportation of apparatus 100 and, therefore, allows the apparatus 100 to utilize the height of natural or man-made structures, such as cliffs or bridges. The wheeled vehicle 102 may accommodate a retractable apparatus 104 for providing a jump-off platform 106. The phrase "accommodate a retractable apparatus 104" may refer to mechanical engagement that may attach the retractable apparatus 104 on top of the wheeled vehicle chassis 102. The retractable apparatus 104 may be arranged in a position extended from the edge of the footprint of the wheeled vehicle 102 for off-bridge access, or it may be arranged in a position within the footprint of the wheeled vehicle 102 for transportation. Such an extended position of the retractable apparatus 104 may provide a bungy jumper with an extended jump-off platform 106 for a bungy jump, while such a stowed position of the retractable apparatus 104 may provide the apparatus 100 with a compact arrangement in relocation.

The jump-off platform 106 may be coupled to the retractable apparatus 104 in a fixed or an unfixed manner. In one example, the movement of jump-off platform 106 may result from the movement of the retractable apparatus 104. When the retractable apparatus 104 is in an extended position, the jump-off platform 106 may accordingly be in an extended position to provide off-bridge access. In another example, the jump-off platform 106 may be rotatably coupled to the retractable apparatus 104 to be able to extend relative to the edge of the wheeled vehicle chassis 102 to provide an extended position for off-bridge access.

The rigging frame 108 may be fixedly coupled to the jump-off platform 106 to secure a safe bungy jumping in a manner of a safety cord having one end attached to the bungy jumper and the other end attached to the rigging frame 108 directly.

Figure 2C:
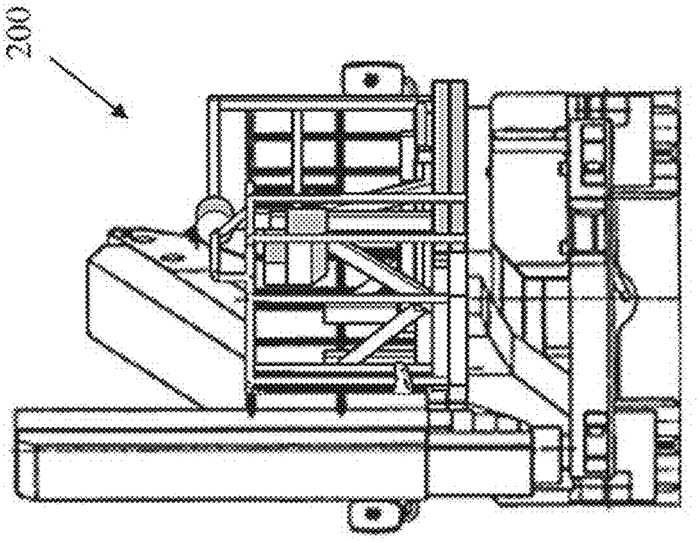
FIG. 2C is a schematic diagram illustrating a rear view of the exemplary mobile bungy apparatus of FIG. 2A, according to various embodiments.
Figure 2A:
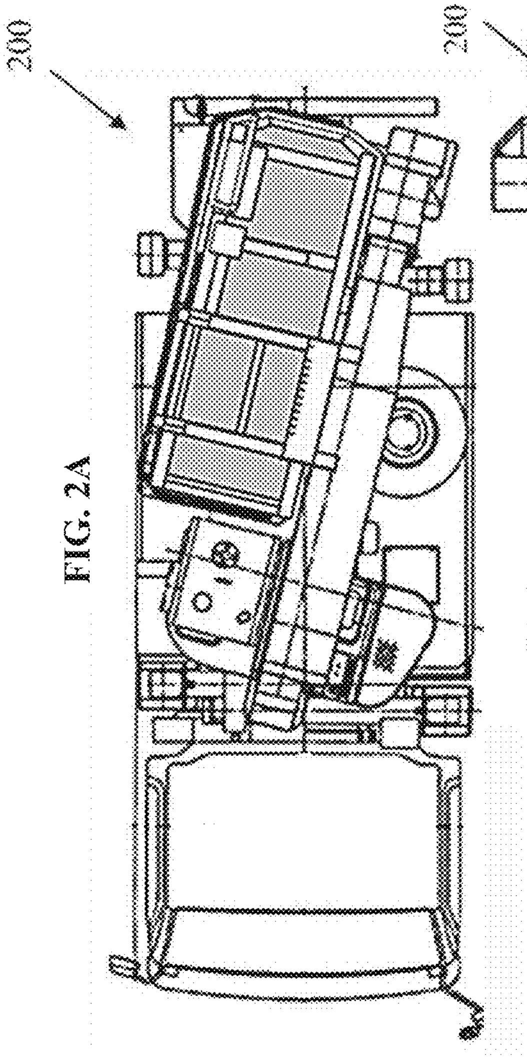
FIG. 2A is a schematic diagram illustrating a top view of an exemplary mobile bungy apparatus in a stowed position, according to various embodiments.
Figure 2B:
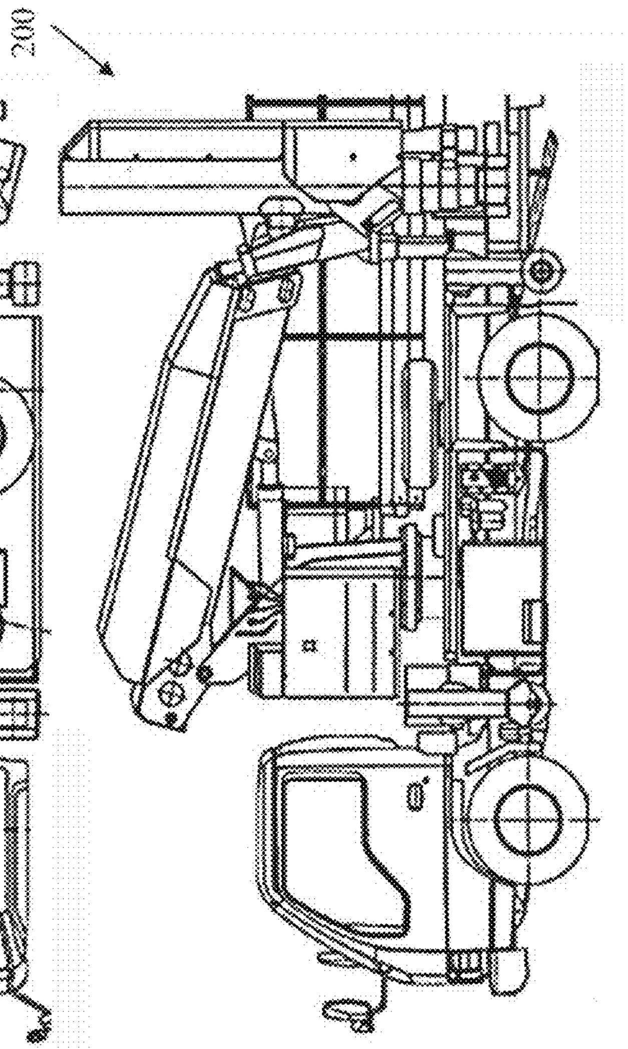
FIG. 2B is a schematic diagram illustrating a side view of the exemplary mobile bungy apparatus of FIG. 2A, according to various embodiments.

FIG. 2A, FIG. 2B, and FIG. 2C show schematic top, side, and rear views, of a mobile bungy apparatus 200 in a stowed position, respectively. With reference to FIG. 1, the wheeled chassis (e.g. 102 in FIG. 1) in FIGS. 2A to 2C is adapted from a truck, and the retractable apparatus (e.g. 102 in FIG. 1) is configured to be arranged in a second stowed position when the jump-off platform (e.g. 104 in FIG. 1) is configured to be arranged in a first stowed position for transportation. Advantageously, such a compact configuration of the apparatus 200 is arranged for transportation/relocation.

Figure 3:
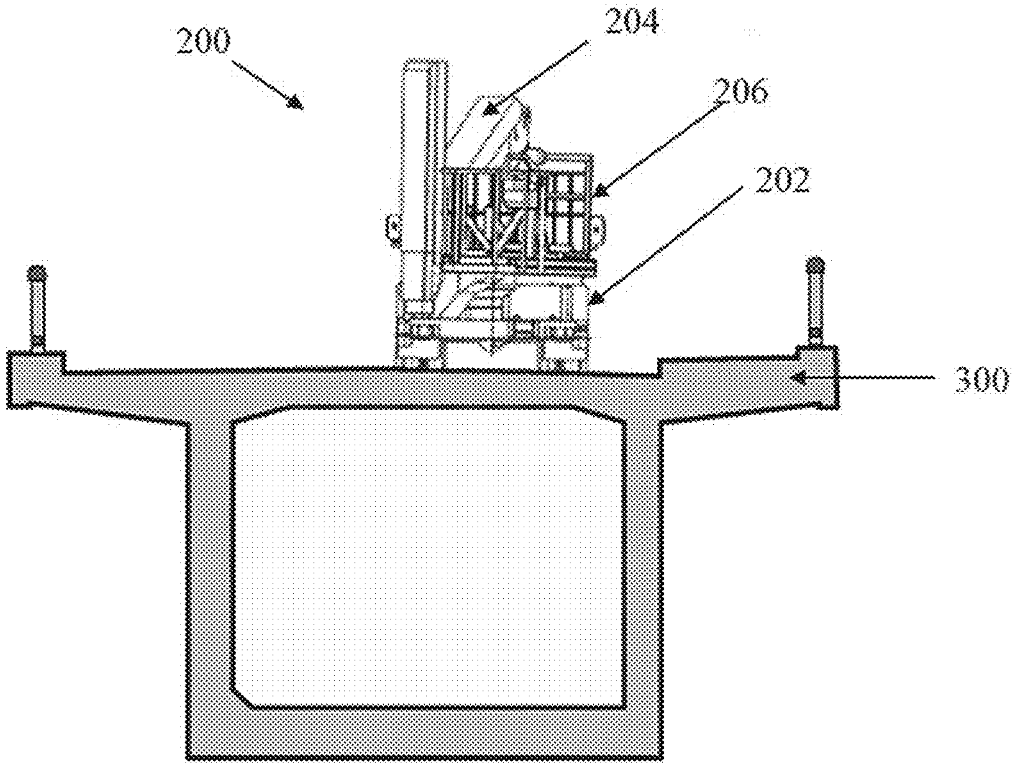
FIG. 3 is a schematic diagram illustrating the exemplary mobile bungy apparatus of FIG. 1C on a cross-sectional view of a bridge, according to various embodiments.

FIG. 3 shows a schematic rear view of a mobile bungy apparatus 200 of FIG. 2C on a cross-sectional view of a bridge 300. As aforementioned, the movement of the jump-off platform 206 may result from the movement of the retractable apparatus 204. Therefore, when the retractable apparatus 204 may be configured to be arranged in a second stowed position, the jump-off platform 206 may thus be configured to be arranged in a first stowed position. As seen in FIG. 3, apparatus 200 may utilize the height of bridge 300 to provide a proper bungy jumping site. In FIG. 3, wheeled vehicle chassis 202 may be modified or adapted from a bridge inspection truck. Advantageously, it may provide flexibility and access to limited or narrowed bungy jumping locations. Moreover, a bridge inspection truck modified vehicle chassis 202 may require less labor to operate, transport, and yet provide a proper bungy jump location without causing any damage to the tall structure onto which the apparatus 200 may be at. The angles of the joints of the retractable apparatus 204 may be maximally folded to maintain the retractable apparatus 204 in the second stowed position and the jump-off platform 206 in a first stowed position, which allow the mobile bungy apparatus 200 to move stably.

In one example, the retractable apparatus 204 may be a modified or adapted portion of a boom truck, a truck mounted with an aerial platform, or any suitable truck. One advantage of the modified retractable apparatus 204 of a bridge inspection or other suitable truck is to provide its attached bungy jump platform jump-off platform 206 with flexible access to bungy jump sites, especially for off and/or under-bridge bungy jumping locations.

In another example, the retractable apparatus may be purpose-designed and manufactured for bungy jumping.

In yet another example, the bungy jumping site may be a bridge, a cliff, or any locations having a great height at which a mobile bungy apparatus may be driven or transported or hauled and stably located.

Figure 4:
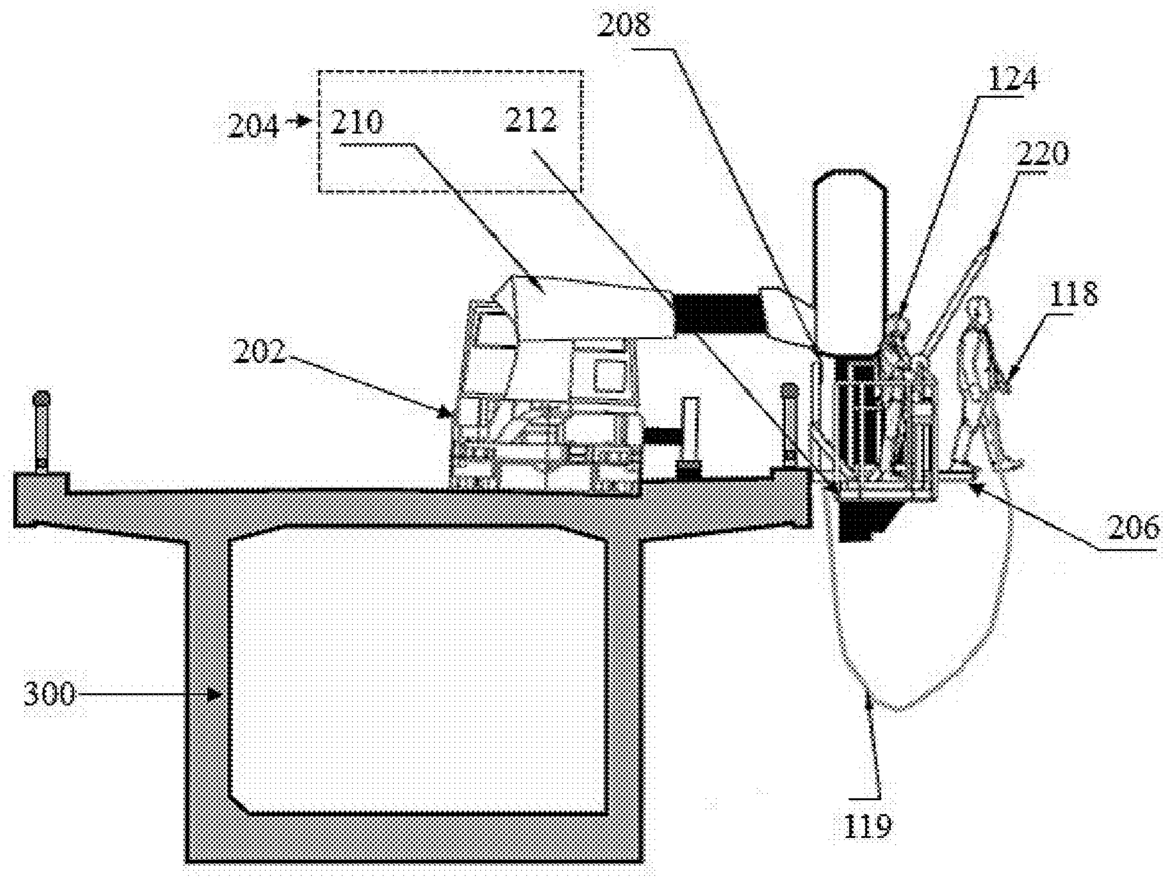
FIG. 4 is a schematic diagram illustrating a rear view of an exemplary mobile bungy apparatus on a cross-sectional view of a bridge, in which portions of the mobile bungy apparatus are in extended positions to provide a bungy jumper with an off-bridge jump-off platform, according to various embodiments.

FIG. 4 shows a schematic rear view of a mobile bungy apparatus 200 on a cross-sectional view of a bridge 300. In FIG. 4, the position of the jump-off platform 206 may be referred to as a first extended position, and the position of the retractable apparatus 204 may be referred to as a second extended position. Thus, the retractable apparatus 204 is configured to be arranged in a second extended position when the jump-off platform 206 is in a first extended position for bungy jumping. The vehicle chassis 202 and a portion of the retractable apparatus 204 remain on the bridge 300, and portions of the retractable apparatus 204 are in a second extended position 108, thus providing a bungy jumper 118 an off-bridge jumping-off location. The term “off-bridge” may refer to positions that are spacially apart from the bridge where elevated locations can be provided for a bungy jump. The off-bridge locations may include but are not limited to the spaces under the bridge, outside the edge of the bridge, or above the bridge. The phrase “outside the edge of the bridge” may refer to positions that are not directly under or above the bridge.

As seen in FIG. 4, the retractable apparatus 204 may include at least two sections: an intermediate section 210 extendable or retractable relative to the wheeled vehicle chassis 202 and an end section 212 movably coupled to the intermediate section 210. The end section 212 may be movably coupled to a jump-off platform 206. In one example, the jump-off apparatus 204 may be slidably coupled to the end section 212, such that the end section 212 of the retractable apparatus 204 together with the jump-off platform 206 are in an off-bridge position, which provides a location for a bungy jumper 118 to start a bungy jump. The end section 212 of the retractable apparatus 204 may also provide a secure space for bungy staff 124 to operate the bungy jumping equipment. The jump-off platform 206 is where a bungy jumper 118 may jump off and, optionally, return after completing a jump. One advantage of having one or more sections in a retractable apparatus 204 is to allow more positions of the retractable apparatus 204 suitable for various situations. In transportation, the retractable apparatus 204 can be folded stably, while in preparation for the jump-off platform 206, the sections may be extended to provide enough space for a bungy jump.

In one example, the jump-off platform 206 may be fixedly or movably coupled to the end section 212 of the retractable apparatus 204.

In yet another example, the jump-off platform 206 may be slidably onto the end section 212 of the retractable apparatus 204. Advantageously, a slidably coupled jump-off platform 206 may be retracted to stack on top of the end section 212 of the retractable apparatus 204 for saving space and increasing stability or be extended relative to the end section 212 to provide a safe and/or comfortable space for a bungy jump.

A rigging frame 208 may be fixedly coupled to the jump-off platform 206 and configured to be secured to one end of a bungy cord 119 having another end securable to a bungy jumper 118. Advantageously, a rigging frame 208 may allow the bungy cord 119 to be securely attached to the jump-off platform 206 and indirectly to the end section 212 of the apparatus to tether or restrict the bungy jumper’s range of movement.

In one example, the rigging frame 208 and the jump-off platform 206 may be unibody manufactured.

In another example, the rigging frame 208 and the jump-off platform 206 may be manufactured separately and welded together.

In another example, the jump-off platform 206 may be extendable from the end section 212 in a direction orthogonal to a lengthwise direction of the end section 212. The phrase “lengthwise direction” may refer to a direction of the length of the end section 212.

In yet another example, the jump-off platform 206 may be extendable from the end section 212 in a direction parallel to a lengthwise direction of the end section 212.

In yet another example, the retractable apparatus 204 mounted on the vehicle chassis 202 may include only one section, to which a jump-off platform 206 may be fixedly or movably coupled to the end of the section 212 to provide a jump-off location.

In yet another example, the retractable apparatus 204 mounted on the vehicle chassis 202 may include more than three sections, wherein a jump-off platform 206 may be fixedly or movably coupled to a section that may provide an elevated jump-off location.

The mobile bungy jump apparatus 200 may also comprise a recovery winch arm 220 for recovering the bungy jumper 118 after a bungy jump completes. The recovery winch arm 220 may be coupled to the retractable apparatus 204 and configured to be secured to an end of a recovery cord (e.g. 122 in FIG. 6) having another end securable to the bungy jumper 118.

In one example, the recovery winch arm 220 may be rotatably coupled to the retractable apparatus 204 and actuatable to allow placement of the recovered bungy jumper 118 on the jump-off platform 206.

In another example, the recovery winch arm 220 may be coupled to the end section 212 of the retractable apparatus 204.

In yet another example, the articulated apparatus 204 may be extended underneath the bridge 300 to provide an under-bridge access apparatus.

Figure 5:
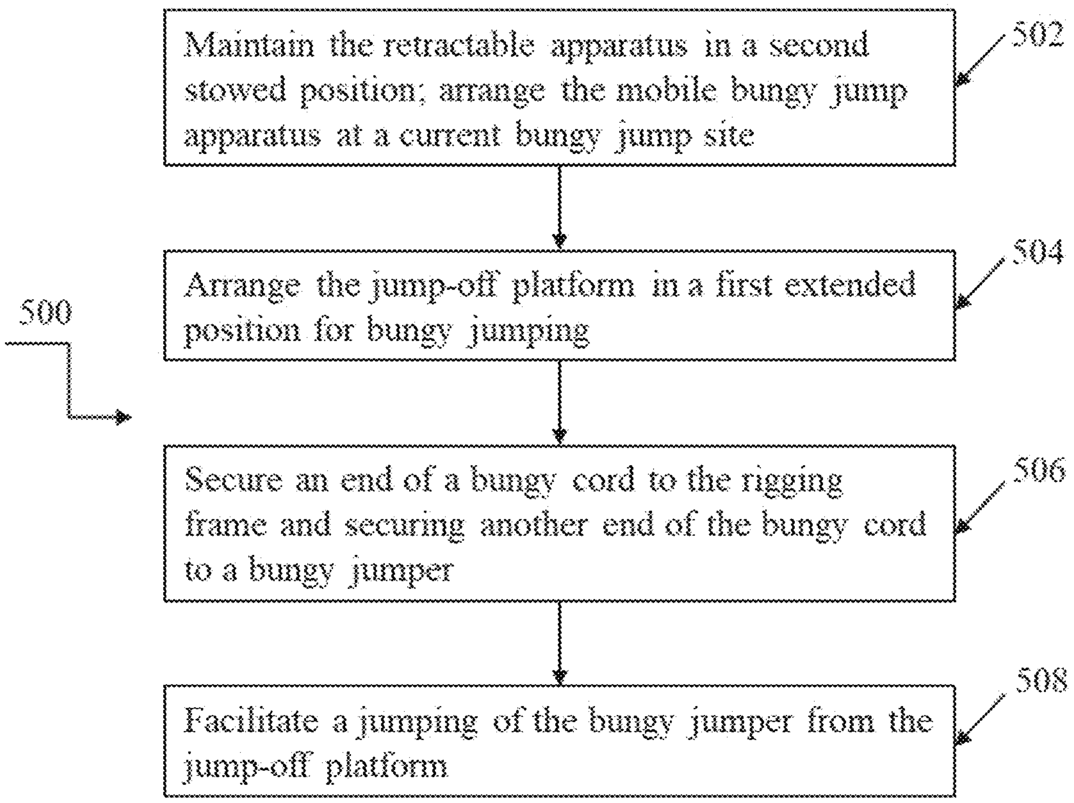
FIG. 5 is a flow chart illustrating a method of operating a mobile bungy apparatus of FIG. 2A to 2C and FIG. 9A to 9C, according to various embodiments.

FIG. 3 and FIG. 4 jointly show a method 500 of operating a mobile bungy apparatus 200. Making reference to FIGS. 3 and 4, FIG. 5 illustrates the same method 500 which may at least include a wheeled chassis (e.g. 202), a retractable apparatus (e.g. 204) mounted on the wheeled chassis (e.g. 202), a jump-off platform (e.g. 206) movably coupled to the retractable apparatus (e.g. 204), and a rigging frame (e.g. 208) fixedly coupled to the jump-off platform. At 500, the method may comprise: at 502, arranging the mobile bungy jumping apparatus 200 at a current bungy site while maintaining the retractable apparatus 204 in a second stowed position (e.g. 204 in FIGS. 2A to 3); at 504, arranging the jump-off platform in a first extended position for bungy jumping (e.g. 206 in FIG. 6); at 506, securing an end of a bungy cord (e.g. 119) to the rigging frame (e.g. 208) and securing another end of the bungy cord (e.g. 119) to a bungy jumper (e.g. 118); at 508, facilitating the jumping of the bungy jumper (e.g. 118) from the jump-off platform (e.g. 206).

With reference to FIG. 3, prior to securing the mobile bungy jump apparatus (e.g. 200) to a current bungy jump site, the method 500 may further include transporting the mobile bungy jump apparatus (e.g. 200) from a previous bungy jump site to the current bungy jump site, which includes arranging the retractable apparatus in a second stowed (e.g. 204) position during the transporting. With reference to FIG. 4, prior to arranging the jump-off platform in a first extended position (e.g. 206) for bungy jumping, the method 500 may further include arranging the retractable apparatus in a second extending position (e.g. 204) to allow the jump-off platform (e.g. 206) in the first extended position for bungy jumping. Arranging the retractable apparatus (e.g. 204) in the second extended position may further comprise: extending the intermediate section (e.g. 210) of the retractable apparatus (e.g. 204) relative to the wheeled vehicle chassis (e.g. 202). The intermediate section (e.g. 210) may be movably coupled to the end section (e.g. 212), which in turn may be movably coupled to the jump-off platform (e.g. 206). The method of arranging the jump-off platform in the first extended position (e.g. 206) for bungy jumping may comprise slidably extending the jump-off platform (e.g. 206) relative to the end section (e.g. 212). Arranging the jump-off platform (e.g. 206) in the first extended position for bungy jumping may also include slidably extending the jump-off platform (e.g. 204) relative to the end section (e.g. 212).

In one example, the jump-off platform (e.g. 206) may be extended in a direction orthogonal to a lengthwise direction of the end section (e.g. 212).

In another example, the jump-off platform (e.g. 206) may be extended in a direction parallel to a lengthwise direction of the end section (e.g. 212).

Figure 6:
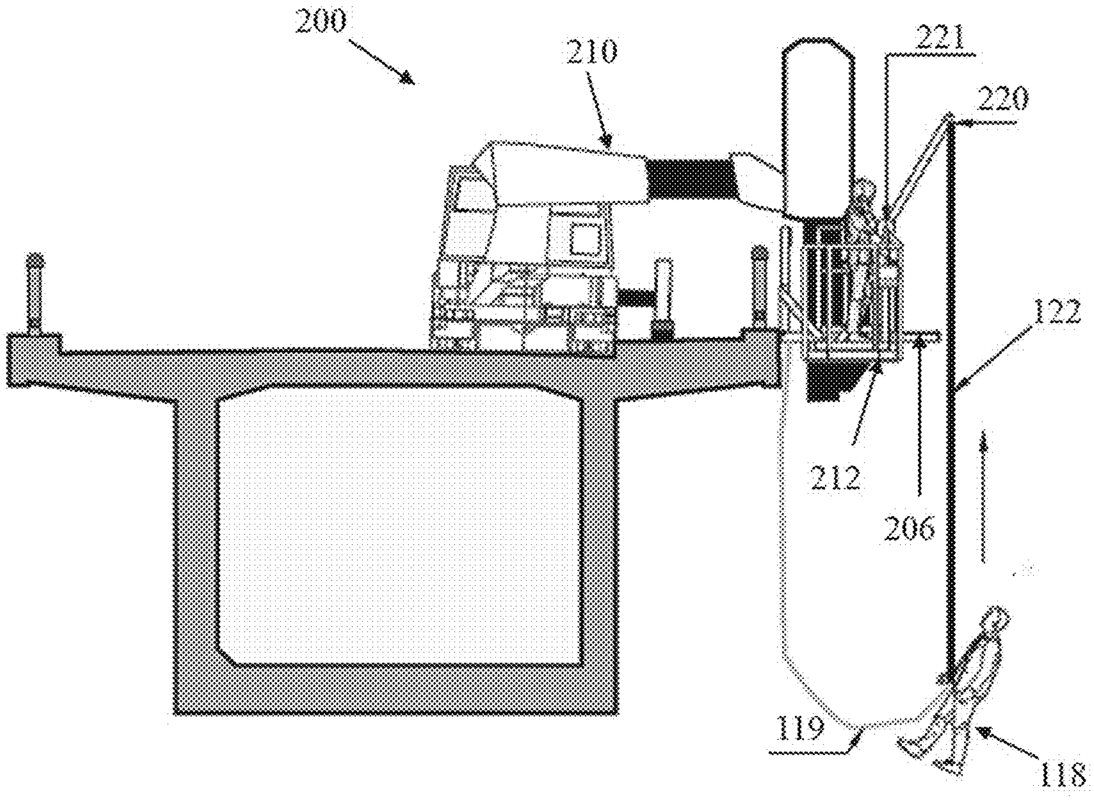
FIG. 6 is a schematic diagram illustrating a rear view of the exemplary mobile bungy apparatus of FIG. 4, in which a bungy jumper is in a cord retrieval process, according to various embodiments.

FIG. 6 shows a rear view of the exemplary mobile bungy apparatus 200 of FIG. 4, in which a bungy jumper 118 is in a bungy cord retrieval process, according to various embodiments. A winching system may include at least a recovery winch 221 rotatably coupled to the end section 212 of the retractable apparatus 204 and a winch arm 220 rotatably attached to one end of a winch rope 122 to facilitate cord retrieval. The other end of the winch rope 122 is attached to the bungy jumper 118. The winching process may be manually or electrically controlled by the bungy staff 124 to lift or recover the bungy jumper back to the jump-off platform 206 (originally jump-off location). Advantageously, the winch system may allow a bungy jumper 118 to recover to the original jump-off location or may allow the bungy jumper 118 to lower to a safe place after a jump completes.

The method of recovering the bungy jumper 118 may comprise the steps of securing an end of a recovery cord 122 to a recovery winch arm 221 which is coupled to the retractable apparatus 206, and securing another end of the recovery cord 122 to a bungy jumper 118. The recovered bungy jumper 118 may be lifted back onto the jump-off platform 206 by rotatably actuating the recovery winch arm 220. Similarly, the recovered bungy jumper 118 may also be lowered to an under-bridge or an under mobile bungy apparatus safe place. The term "under-bridge" may refer to the space directly under the bridge, excluding the space outside the edge of the bridge.

Figure 7:
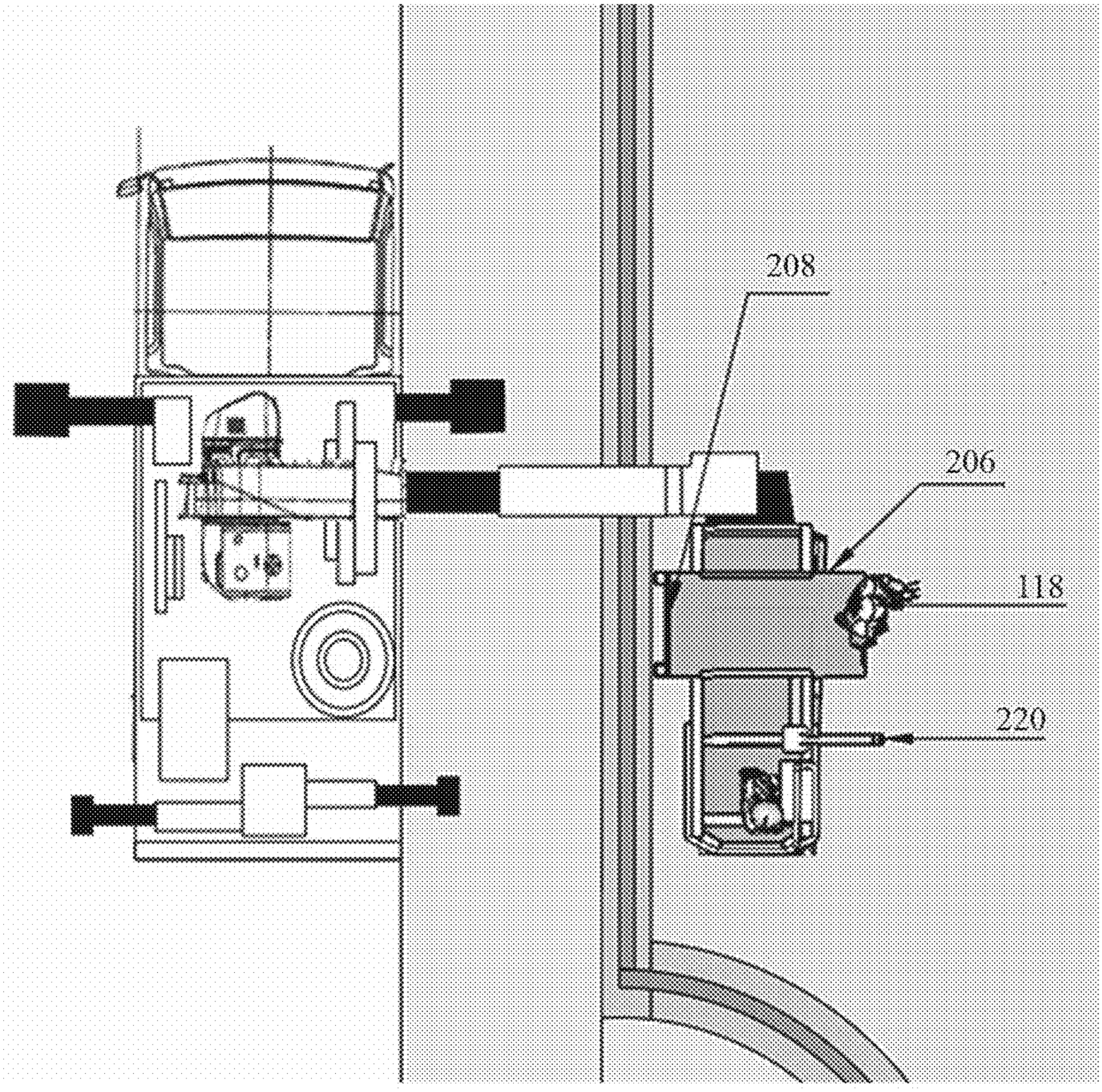
FIG. 7 is a schematic diagram illustrating a top view of the exemplary mobile bungy jump apparatus of FIG. 4, according to various embodiments.

FIG. 7 shows a schematic top view of the exemplary mobile bungy jump apparatus 200 of FIG. 4, according to various embodiments.

Figure 8:
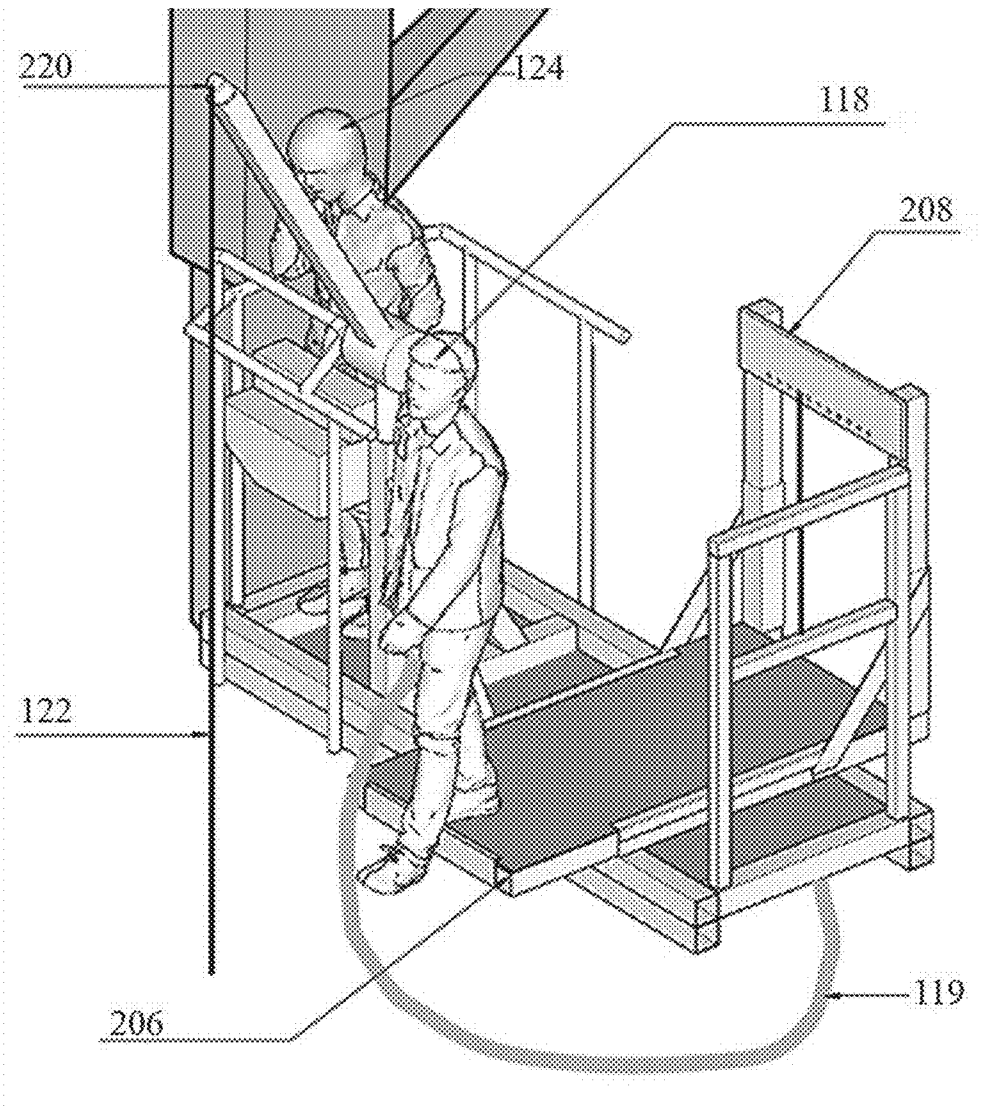
FIG. 8 is a schematic diagram illustrating the details of the extendable portions of the exemplary mobile bungy jumping apparatus of FIG. 4, according to various embodiments.

FIG. 8 shows a schematic perspective view of the end section 212 together with the jump-off platform 206 of the exemplary bungy jumping apparatus of FIG. 4, according to various embodiments. One end of the bungy cord 119 may be attached to the bungy jumper 118 and the other end of the bungy cord 119 may be attached to the rigging frame 208 which in turn may be coupled to jump-off platform 206 in manners of unibody manufacturing or welding.

FIGS. 9A, 9B, and 9C show schematic top, front, and rear views of a mobile bungy apparatus 900 in a stowed position, respectively. With reference to FIG. 1, the wheeled chassis (e.g. 102 in FIG. 1) in FIGS. 9A to 9C is adapted from a truck, and the retractable apparatus (e.g. 102 in FIG. 1) is configured to be arranged in a second stowed position when the jump-off platform (e.g. 104 in FIG. 1) is configured to be arranged in a first stowed position for transportation. Advantageously, such a compact configuration of apparatus 200 is arranged for transportation/relocation.

Figure 10:
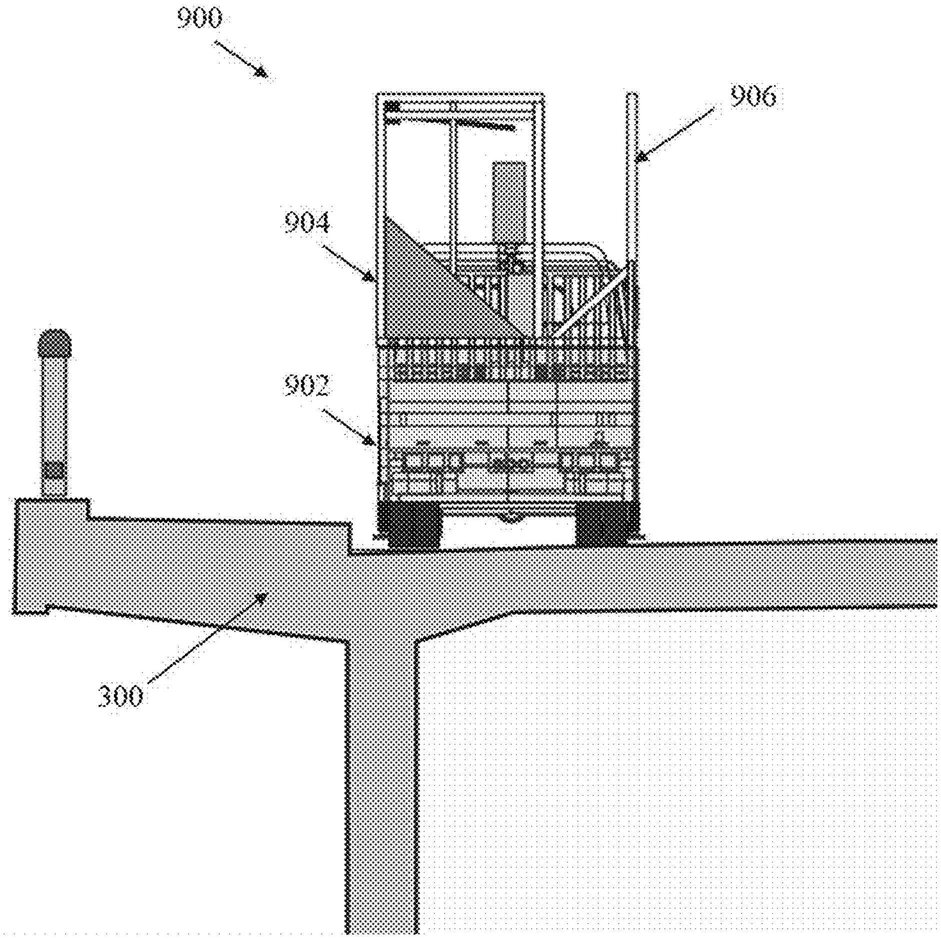
FIG. 10 is a schematic diagram illustrating the exemplary mobile bungy jump apparatus of FIG. 9C on a cross-sectional view of a bridge, according to various embodiments.

FIG. 10 is a schematic diagram illustrating a rear view of the mobile bungy jump apparatus of FIG. 9C on a cross-sectional view of bridge 300. As seen in FIG. 10, the retractable apparatus 904 may be mounted on the wheeled vehicle chassis 902, and the jump-off platform 906 may be rotatably coupled to the retractable apparatus 906. When the retractable apparatus 906 is in a stowed position, the jump-off platform 904 is in a stowed position accordingly. In FIG. 10 and the subsequent figures, the stowed position of the jump-off platform 906 is referred to as a first stowed position, and the stowed position of the retractable apparatus 904 is referred to as a second stowed position.

Figure 11:
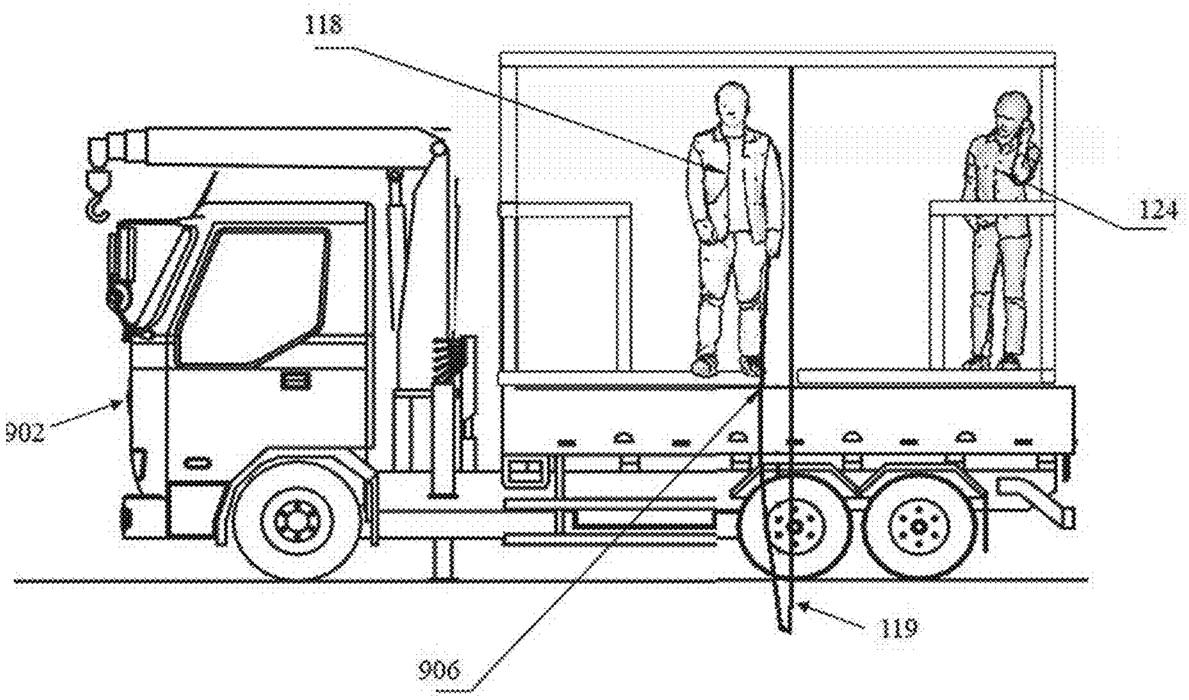
FIG. 11 is a schematic diagram illustrating a side view of another exemplary mobile bungy apparatus in an extended position, according to various embodiments.

FIG. 11 is a schematic diagram illustrating a side view of the mobile bungy jump apparatus 900 in an extended position. In FIG. 11, the jump-off platform 906 may be rotated 90 degrees along an axis parallel to the lengthwise direction of the wheeled chassis 902, from a first stowed position where the jump-off platform 906 is on top of the wheeled vehicle chassis to a first extended position where the jump-off platform 906 is extended relative to the wheeled chassis 902 for providing the bungy jumper 118 with an off-bridge jump-off location.

Figure 12:
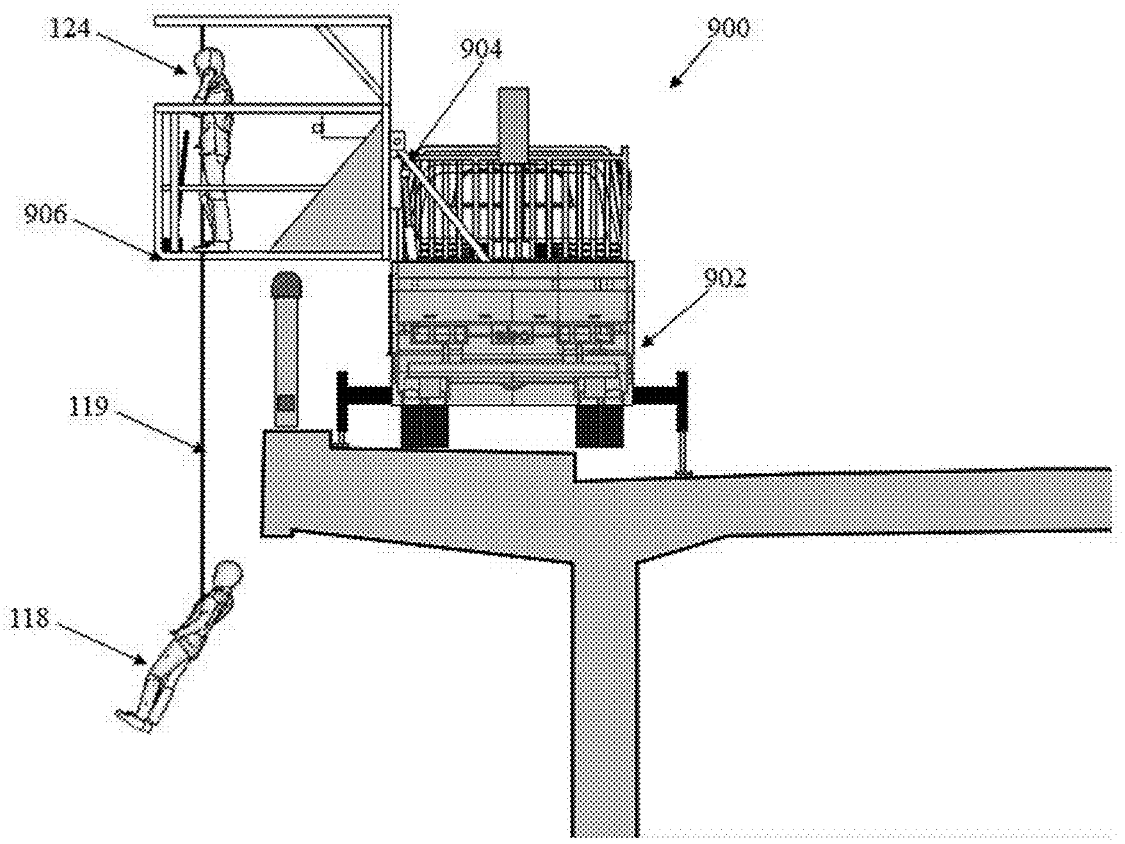
FIG. 12 is a schematic diagram illustrating a rear view of the exemplary mobile bungy jump apparatus of FIG. 11 on a cross-sectional view of a bridge, in which a bungy jumper has jumped off an extended jump-off platform, according to various embodiments.

FIG. 12 is a schematic diagram illustrating a rear view of the mobile bungy jump apparatus of FIG. 11. As seen in FIG. 12, the retractable apparatus 904 includes a triangle structure having one side with two vertices unmovably or fixedly mounted to the wheeled vehicle chassis 902 to secure the jump-off platform 906 and a vertex unfixed or movably coupled to the wheeled vehicle chassis 902, and the retractable apparatus 904 is rotatably coupled to the jump-off platform to provide a rotation along an axis parallel to a lengthwise direction of the wheeled vehicle chassis by 90 degrees to transfer the jump-off platform from the first stowed position to the first extended position. In one example, the retractable apparatus 904 may be fixedly coupled to the wheeled chassis 902 and may not be arranged in an extended position.

In another example, a recovery winch arm (not shown) may be coupled to the jump-off platform 906 and configured to be secured to an end of a recovery cord having another end securable to a bungy jumper 118. The recovery winch arm may be rotatably coupled to the jump-off platform 906 and actuatable to allow placement of the recovered bungy jumper 118 on the jump-off platform 906. The rigging frame and recovery winch arm are not shown in FIGS. 9A to 12, but they may be provided at the jump-off platform 906 similar to the embodiments shown in FIGS. 7 and 8.

The main steps in the method of operating the bungy jump apparatus 900 are similar to the method 500 of operating the bungy jump apparatus 200. Different steps relate to prior to arranging the jump-off platform 906 in a first extended position for bungy jumping. The method of operating the apparatus 900 may include rotating the jump-off platform 906 with 90 degrees via a hinge which is coupled to the articulated apparatus, along an axis parallel to a lengthwise direction of the wheeled vehicle chassis 902 to transfer the jump-off platform 906 from the first stowed position (e.g. 906 in FIG. 10) to the first extended position (e.g. 906 in FIG. 12), and wherein the retractable apparatus 904 may remain in the same position as the jump-off platform 906 is in the first stowed position.

The method further includes securing an end of a recovery cord to a recovery winch arm which is coupled to the jump-off platform 906 and securing another end of the recovery cord to the bungy jumper 118.

The recovery winch arm may be rotatably coupled to the retractable apparatus 904, and after facilitating the jumping of the bungy jumper, the method includes rotatably actuating the recovery winch arm to place the recovered bungy jumper 118 on the jump-off platform 906.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims and therefore intended to be embraced.

The invention claimed is:

1. A mobile bungy jump apparatus comprising:

a wheeled vehicle chassis;

a retractable apparatus mounted on the wheeled vehicle chassis for providing a jump-off platform with a first stowed position for transportation or a first extended position for off-bridge access, the jump-off platform movably coupled to the retractable apparatus and storable substantially within a footprint of the wheeled vehicle chassis when the jump-off platform is in the first stowed position, and extendable from the retractable apparatus when the retractable jump-off platform is in the first extended position for bungy jumping; and a rigging frame fixedly coupled to the jump-off platform and configured to be secured to an end of a bungy cord having another end securable to a bungy jumper;

wherein the retractable pparatos includes: an intermediate section extendable relative to the wheeled vehicle chassis; and an end section movably coupled thereto, wherein the jump-off platform is movably coupled to the end section.

2. The mobile bungy jump apparatus of claim 1, wherein the retractable apparatus is configured to be arranged in a second stowed position when the jump-off platform is in the first stowed position for transportation, or a second extended position when the jump-off platform is in a first extended position for bungy jumping.

3. The mobile bungy jump apparatus of claim 1, wherein the jump-off platform is slidably coupled to the end section.

4. The mobile bungy jump apparatus of claim 1, wherein the jump-off platform is extendable from the end section in a direction orthogonal or parallel to a lengthwise direction of the end section.

5. The mobile bungy jump apparatus of claim 2, further comprising:

a recovery winch arm coupled to the retractable apparatus and configured to be secured to an end of a recovery cord having another end securable to the bungy jumper.

6. The mobile bungy jump apparatus of claim 5, wherein the recovery winch arm is rotatably coupled to the retractable apparatus and actuatable to allow placement of the recovered bungy jumper on the jump-off platform.

7. The mobile bungy jump apparatus of claim 2, wherein the retractable apparatus includes an under-bridge access apparatus.

8. The mobile bungy jump apparatus of claim 1, wherein the retractable apparatus is mounted on the wheeled vehicle chassis, and the jump-off platform is rotatably coupled to the retractable apparatus.

9. The mobile bungy jump apparatus of claim 8, further comprising a hinge rotatably coupling the jump-off platform to the retractable apparatus, and configured to transfer the jump-off platform from the first stowed position to the first extended position.

10. The mobile bungy jump apparatus of claim 8, wherein the retractable apparatus includes a triangle structure having one side with two vertices unmovably mounted to the wheeled vehicle chassis to secure the jump-off platform and a vertex unfixed to the wheeled vehicle chassis, and wherein the retractable apparatus is rotatably coupled to the jump-off platform to provide a rotation along an axis parallel to a lengthwise direction of the wheeled vehicle chassis by 90 degrees to transfer the jump-off platform from the first stowed position to the first extended position.

11. The mobile bungy jump apparatus of claim 8, further comprising:

a recovery winch arm coupled to the jump-off platform and configured to be secured to an end of a recovery cord having another end securable to a bungy jumper.

12. The mobile bungy jump apparatus of claim 11, wherein the recovery winch arm is rotatably coupled to the jump-off platform and actuatable to allow placement of the recovered bungy jumper on the jump-off platform.

13. A method of operating a mobile bungy apparatus which comprises: a wheeled vehicle chassis; a retractable apparatus mounted on the wheeled vehicle chassis; a jump-off platform movably coupled to the retractable apparatus; and a rigging frame fixedly coupled to the jump-off platform, the method comprising:

while maintaining the retractable apparatus in a second stowed position, arranging the mobile bungy jump apparatus at a current bungy jump site;

arranging the jump-off platform in a first extended position for bungy jumping;

securing an end of a bungy cord to the rigging frame and securing another end of the bungy cord to a bungy jumper; and facilitating a jumping of the bungy jumper from the jump-off platform; wherein arranging the retractable apparatus in the second extended position includes: extending an intermediate section of the retractable apparatus relative to the wheeled vehicle chassis, wherein an end section is movably coupled to the intermediate section, wherein the jump-off platform is movably coupled to the end section.

14. The method of claim 13, wherein prior to securing the mobile bungy jump apparatus to a current bungy jump site, the method further comprising:

transporting the mobile bungy jump apparatus from a previous bungy jump site to the current bungy jump site, including arranging the retractable apparatus in a second stowed position during the transporting.

15. The method of claim 13, wherein prior to arranging the jump-off platform in the first extended position for bungy jumping, the method further comprising:

arranging the retractable apparatus in a second extended position to allow arrangement of the jump-off platform in the first extended position for the bungy jumping.

16. The method of claim 13, wherein the jump-off platform is slidably coupled to the end section, wherein arranging the jump-off platform in the first extended position for bungy jumping includes:

slidably extending the jump-off platform relative to the end section.

17. The method of claim 13, wherein arranging the jump-off platform in the first extended position includes:

extending the jump-off platform from the end section in a direction orthogonal or parallel to a lengthwise direction of the end section.

18. The method of claim 13, further comprising:

securing an end of a recovery cord to a recovery winch arm which is coupled to the retractable apparatus and securing another end of the recovery cord to the bungy jumper.

19. The method of claim 18, wherein the recovery winch arm is rotatably coupled to the retractable apparatus, wherein after facilitating the jumping of the bungy jumper, the method further comprising:

rotatably actuating the recovery winch arm to place the recovered bungy jumper on the jump-off platform.

20. The method of claim 13, wherein the retractable apparatus includes an under-bridge access apparatus.

21. The method of claim 13, wherein prior to arranging the jump-off platform in the first extended position for bungy jumping, the method further comprising:

rotating the jump-off platform with 90 degrees via a hinge which is coupled to the retractable apparatus, along an axis parallel to a lengthwise direction of the wheeled vehicle chassis to transfer the jump-off platform from the first stowed position to the first extended position, and wherein the retractable apparatus is remained in the same position while the jump-off platform is in the first stowed position.

22. The method of claim 21, further comprising:

securing an end of a recovery cord to a recovery winch arm which is coupled to the jump-off platform and securing another end of the recovery cord to the bungy jumper.

23. The method of claim 22, wherein the recovery winch arm is rotatably coupled to the retractable apparatus, wherein after facilitating the jumping of the bungy jumper, the method further comprising:

rotatably actuating the recovery winch arm to place the recovered bungy jumper on the jump-off platform.

* * * * *